(12) United States Patent
Haller et al.

(10) Patent No.: US 8,681,422 B2
(45) Date of Patent: Mar. 25, 2014

(54) OPTICAL PROCESSING DEVICE EMPLOYING A DIGITAL MICROMIRROR DEVICE (DMD) AND HAVING REDUCED WAVELENGTH DEPENDENT LOSS

(75) Inventors: Mitchell E. Haller, Marlboro, NJ (US); Jefferson L. Wagener, Morristown, NJ (US)

(73) Assignee: Nistica, Inc., Bridgewater, NJ (US)

( * ) Notice: Subject to any disclaimer, the term of this patent is extended or adjusted under 35 U.S.C. 154(b) by 14 days.

(21) Appl. No.: 13/325,555

(22) Filed: Dec. 14, 2011

(65) Prior Publication Data

US 2013/0155512 A1    Jun. 20, 2013

(51) Int. Cl.
*G02B 5/18* (2006.01)

(52) U.S. Cl.
USPC ............................................. 359/572; 385/18

(58) Field of Classification Search
USPC .................... 398/79, 82, 83, 84, 86; 359/573; 385/18, 37
See application file for complete search history.

(56) References Cited

U.S. PATENT DOCUMENTS

| | | | | |
|---|---|---|---|---|
| 6,760,501 | B2 * | 7/2004 | Iyer et al. | 385/16 |
| 6,956,687 | B2 * | 10/2005 | Moon et al. | 359/223.1 |
| 7,639,906 | B1 * | 12/2009 | Strasser et al. | 385/24 |
| 2001/0035939 | A1 * | 11/2001 | Mihashi et al. | 351/212 |
| 2002/0079432 | A1 | 6/2002 | Lee et al. | |
| 2002/0176151 | A1 | 11/2002 | Moon et al. | |
| 2002/0181858 | A1 * | 12/2002 | Bouevitch | 385/24 |
| 2006/0159395 | A1 * | 7/2006 | Hnatiw et al. | 385/37 |
| 2007/0299487 | A1 * | 12/2007 | Shadduck | 607/89 |
| 2010/0103498 | A1 | 4/2010 | Pan | |

OTHER PUBLICATIONS

Khan et al. ("Demonstration of the MEMS Digital Micromirror Device-Based Broadband Reconfigurable Optical Add-Drop Filter for Dense Wavelength-Division-Multiplexing Systems," Lightwave Technology, Journal of, vol. 25, No. 2, pp. 520-526, Feb. 2007).*
Sakurai et al. ("LCOS-Based Wavelength Blocker Array With Channel-by-Channel Variable Center Wavelength and Bandwidth," Photonics Technology Letters, IEEE , vol. 23, No. 14, pp. 989,991, Jul. 2011).*
Fastie, "A Small Plane Grating Monochromator", Journal of the Optical Society of America, vol. 42 No. 9, p. 641-647, Sep. 1952.*
Nabeel A. Riza et al. "Broadband Optical Equalizer Using Fault-Tolerant Digital Micromirrors", Optics Express, vol. 11, No. 13, Jun. 30, 2003, pp. 1559-1565.
Riza N. A. et al., "Broadband All-Digital Variable Fiber-Optic Attenuator Using Digital Micromirror Device" IEEE Photonics Technology Letters, vol. 19, No. 21, Nov. 1, 2007, pp. 1705-1707.
Yoder et al. "DLP Technology Applicaitons in Optical Networking" Proceedings of SPIE, vol. 4457, Nov. 8, 2001, pp. 54-61.

* cited by examiner

*Primary Examiner* — Arnel C Lavarias
(74) *Attorney, Agent, or Firm* — Stuart H. Mayer; Mayer & Williams PC (57) ABSTRACT

An optical arrangement includes an actuatable optical element and a compensating optical element. The actuatable optical element is provided to receive an optical beam having a plurality of spatially separated wavelength components and diffract the plurality of wavelength components in a wavelength dependent manner. The compensating optical element directs the optical beam to the actuatable optical element. The compensating optical element compensates for the wavelength dependent manner in which the wavelength components are diffracted by the actuatable optical element.

23 Claims, 7 Drawing Sheets

OPTICAL PROCESSING DEVICE EMPLOYING A DIGITAL MICROMIRROR DEVICE (DMD) AND HAVING REDUCED WAVELENGTH DEPENDENT LOSS

BACKGROUND

Conventionally, an optical processing device has been used which includes a dispersion element (for example, a grating) to disperse an optical beam and an actuatable optical element allowing each wavelength in each of the dispersed beams to be incident on any of a plurality of output paths.

One example of such an actuatable optical element is a DMD (Digital Micromirror Device), which includes an array of micromirror elements, each of which is individually actuatable. The DMD may selectively switch an optical path of reflected wavelength components to any one of multiple output paths by adjusting the position of the mirror elements to control the direction in which the wavelength components are reflected. Such optical processing devices can be used to process the wavelengths in an optical beam in a variety of different ways for a variety of different purposes, including switching, wavelength attenuation and wavelength blocking

SUMMARY

In accordance with one aspect of the invention, an optical arrangement is provided which includes an actuatable optical element and a compensating optical element. The actuatable optical element is provided to receive an optical beam having a plurality of spatially separated wavelength components and diffract the plurality of wavelength components in a wavelength dependent manner. The compensating optical element directs the optical beam to the actuatable optical element. The compensating optical element compensates for the wavelength dependent manner in which the wavelength components are diffracted by the actuatable optical element.

In accordance with another aspect of the invention, an optical processing device includes at least two optical input/output ports for receiving an optical beam and dispersion element for receiving the optical beam from one of the ports and spatially separating the optical beam into a plurality of wavelength components. The device also includes a collimating lens for collimating the plurality of wavelength components and an actuatable optical element. The actuatable optical element is provided to receive the collimated wavelength components from the collimating element and diffract the plurality of wavelength components in a wavelength dependent manner. A compensating optical element is located in an optical path between the dispersion element and the actuatable optical element, The compensating optical element compensates for the wavelength dependent manner in which the wavelength components are diffracted by the actuatable optical element.

DETAILED DESCRIPTION

Figure 1:
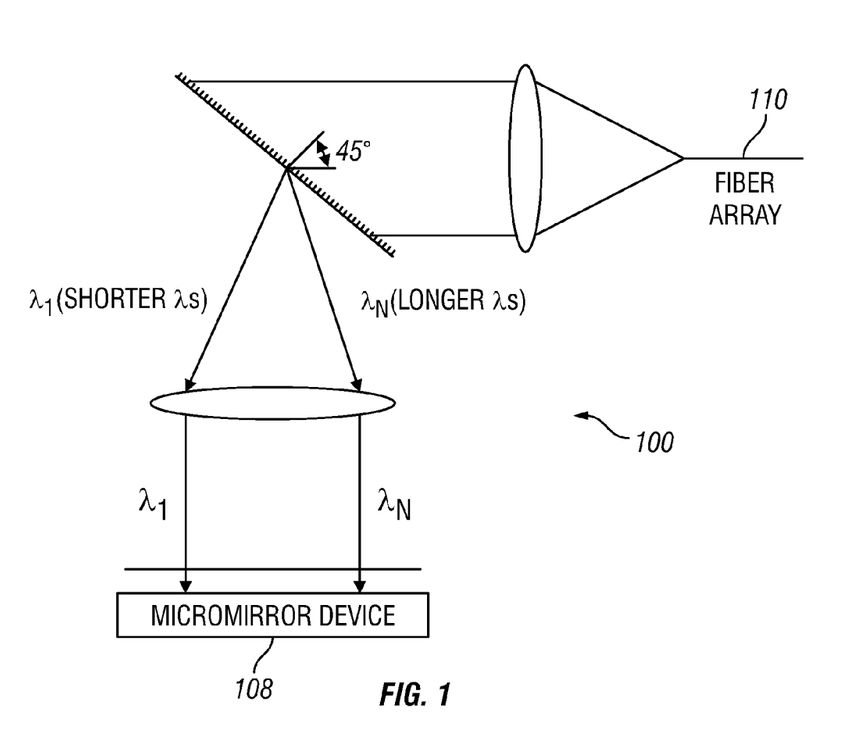
FIG. 1 shows a simplified example of a wavelength blocker that is based on a MEMs mirror array such as a DMD.

Many optical processing devices direct an incoming and outgoing optical beam along the same optical path. Such devices may include optical switches, waveblockers and optical attenuators. FIG. 1 shows a simplified example of a wavelength blocker 100 that is based on a MEMs mirror array 108 such as a DMD. In a 1×1 wavelength blocker the fiber array 110 is a single fiber that serves as an input and output port. Often a circulator (not shown) or other means are used to separate the incoming and outgoing beams. If the fiber array includes N fibers, then each fiber serves as an input and output port. Such a device provides N 1×1 wavelength blockers using a common optical fabric and is referred to as a wavelength blocker array. In such a device the launch optics would generally require the fiber array and a series of circulators or the like to separate each of the N incoming beams and the N outgoing beams.

Figure 2:
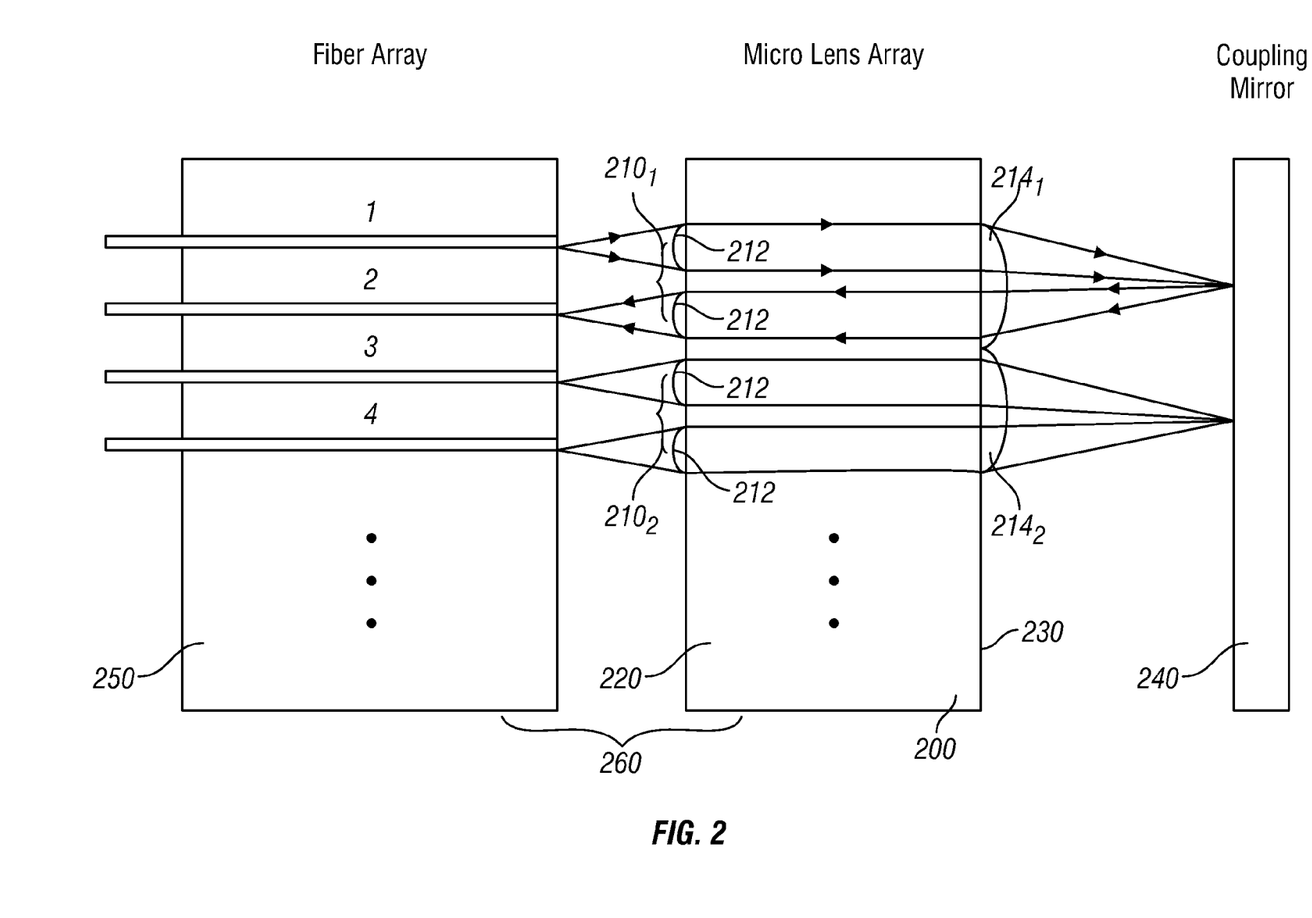
FIG. 2 shows another example of an optical processing device.

Another example of an optical processing device is shown in FIG. 2. In this particular example, N (e.g., 15) 1×1 switches are formed using a coupling mirror. In this example a less complex, less costly, launch optics arrangement is employed which avoids the need for circulators or the like. The launch optics arrangement 260 includes a fiber array 250 in combination with a lenslet array 200. The fiber array 250 typically consists of two V-groove plates that secure the input/output fibers. FIG. 2 shows two fiber pairs; pair one includes fibers 1 and 2 and pair two includes fibers 3 and 4.

It should be noted that while for purposes of illustration the example of the launch optics arrangement 260 shown in FIG. 2 includes a fiber array, more generally the launch optics arrangement 260 may include any type of waveguide array such as a planar waveguide array, for example. Moreover, the waveguides employed in the array may all be of the same type or a combination of different types (e.g., fiber and planar).

The lenslet array 200 includes inner and outer opposing surfaces 220 and 230 and is formed from silica or another suitably optically transparent material. A series of collimating lens pairs $210_1$, $210_2$ are arranged on the inner surface 220 of the lenslet array 200. Each collimating lens pair 210 includes two collimating lenses 212. Likewise, a series of coupling lens $214_1$, $214_2$ are formed on the outer surface 230 of the lenslet array 200. Each collimating lens pair 210 is in registration with one of the coupling lens 214. For example, in FIG. 2, collimating lens pair $210_1$ is in registration with coupling lens $214_1$ and collimating lens pair $210_2$ is in registration with coupling lens $214_2$. Thus, there are twice as many collimating lenses 212 as coupling lenses 214.

The pitch of the collimating lenses 212 is the same as the pitch of the fibers in the fiber array 250. Accordingly, the fiber array 250 and the lenslet array 200 are arranged so that each of the collimating lenses 212 of the lenslet array 200 is in registration with one of the fiber outputs in the fiber array 250. In some particular implementations the separation between the collimating lenses 212 and the coupling lenses 214 may be about equal to the sum of their individual focal lengths.

The operation of the launch optics arrangement 260 in FIG. 2 is as follows. A light beam from an input fiber in each fiber pair is communicated from the fiber array 250 into the lenslet array 200 through the collimating lens 212 with which it is in registration. For instance, in FIG. 2 light from fiber 1 is shown entering its corresponding collimating lens 212 in collimating lens pair 210$_1$. The collimating lens 212 directs a collimated beam to the coupling lens 214 with which it is in registration. In FIG. 2, the collimated beam from fiber 1 is collimated by collimating lens 212 in collimating lens pair 210$_1$, which directs the collimated beam to coupling lens 214$_1$.

The coupling lens 214, in turn, focuses the beam in a launch plane, where, in the example shown in FIG. 2, a coupling mirror 240 is located. The coupling mirror 240 reflects the beam so that it is directed back through the same coupling lens from which it was received (e.g., coupling lens 214$_1$ in FIG. 2). The coupling lens 214 collimates the reflected beam and directs it back through the lenslet array 200. Because of the angle through which the beam was reflected by the coupling mirror 240, the reflected collimated beam is parallel to and spatially offset from the incoming collimated beam. The reflected collimated beam is directed to the output collimating lens of the collimating lens pair that initially received the beam from fiber array 250. As shown in FIG. 2, for example, the beam directed into the lenslet array 200 through the input collimating lens 212 of collimating lens pair 210$_1$ is directed to the adjacent output collimating lens 212 in collimating lens pair 210$_1$. The output collimating lens 212 focuses the reflected beam onto the input of the fiber in registration with the output collimating lens 212, which in the example shown in FIG. 2 is fiber 2. In this way the optical processing device shown in FIG. 2 directs an input beam received from one fiber (e.g., fiber 1) in a fiber pair to another fiber (e.g., fiber 2) in the same fiber pair, thus providing a switching function.

Figure 3A:
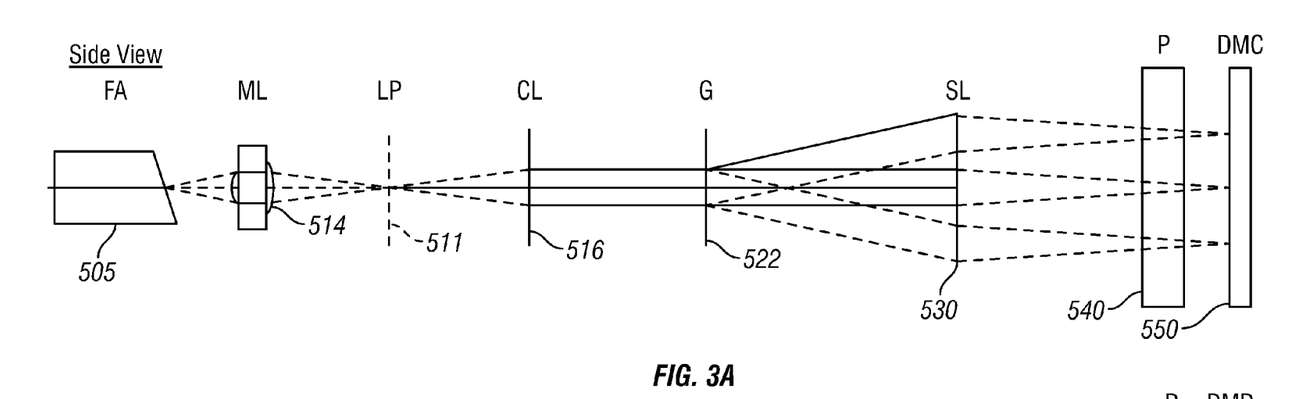
FIGS. 3a is a side view and FIG. 3b is a top view of another example of an optical processing device.
Figure 3B:
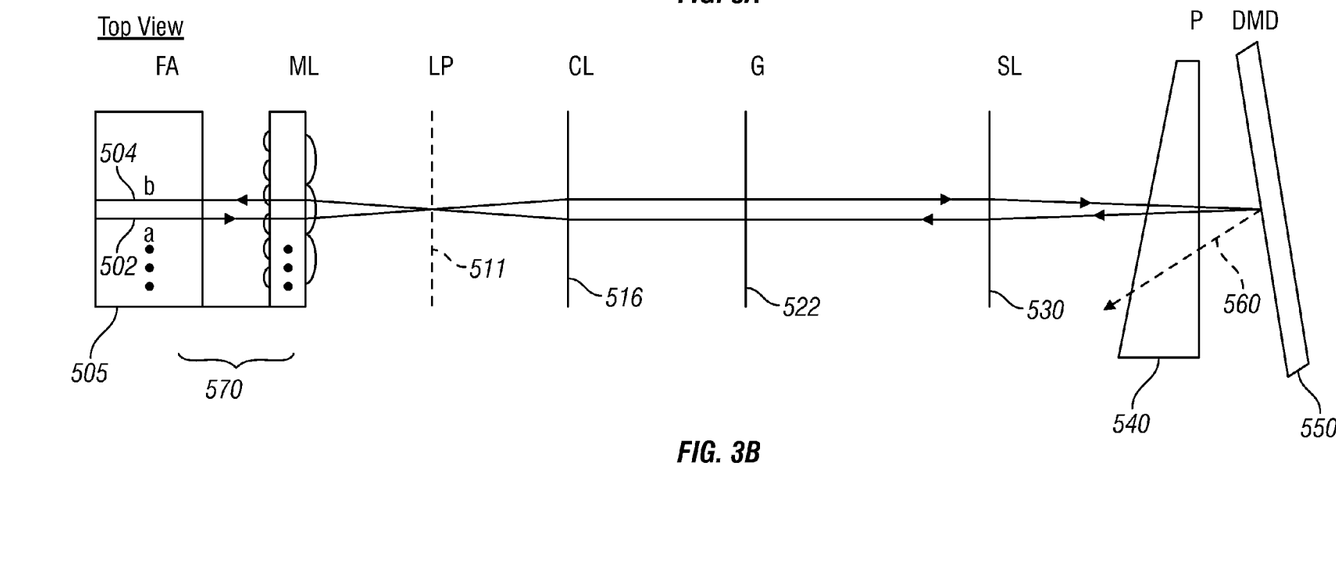

Another example of an optical processing device is shown in FIGS. 3a (side view) and 3b (top view). This example employs the same optical launch arrangement as shown in FIG. 2, but replaces the coupling mirror 240 with an optical system that includes a DMD 550, In this particular example, N 1×1 wavelength blockers are formed. If, for instance, the optical processing device includes 15 1×1 wavelength blockers (only three of which are shown in FIG. 3), fiber array 505 would include 30 input/output fibers.

As shown, the optical launch arrangement 570 is followed by collimating lens 516, diffraction gratings 522, scan lens 530, compensating prism 540 and DMD 550. As best seen in the top view of FIG. 3b, the DMD 550 is tilted with respect to the optical axis of the scan lens 530 in a plane in which the fibers of the launch optics arrangement 570 extend.

In operation, an optical beam entering the optical launch arrangement 570 from a fiber 502 exits the corresponding collimating lens 514 and comes to a virtual focus in the launch plane 511. The optical beam is then collimated by a collimating lens 516. The diffraction grating 522 next diffracts the collimated beam and the scan lens 530 focuses the spectrally dispersed beams onto the DMD 550 after passing through the compensating prism 540. When set to the pass state, the individual mirrors of the DMD 550 are tilted to reflect the beam nearly back on itself (near Littrow) so that it travels back through the device and exits through the corresponding waveguide 504 of the launch optics arrangement 570. Alternatively, when set to the blocking state, the individual mirrors of the DMD 550 are actuated so that are tilted at an angle which causes the beam to exit the device (see beam 560 in FIG. 3b). Although FIG. 3 shows the operation for only the coupled fiber pair 502 and 504, the coupling described above occurs for all of the fiber pairs.

Figure 4:
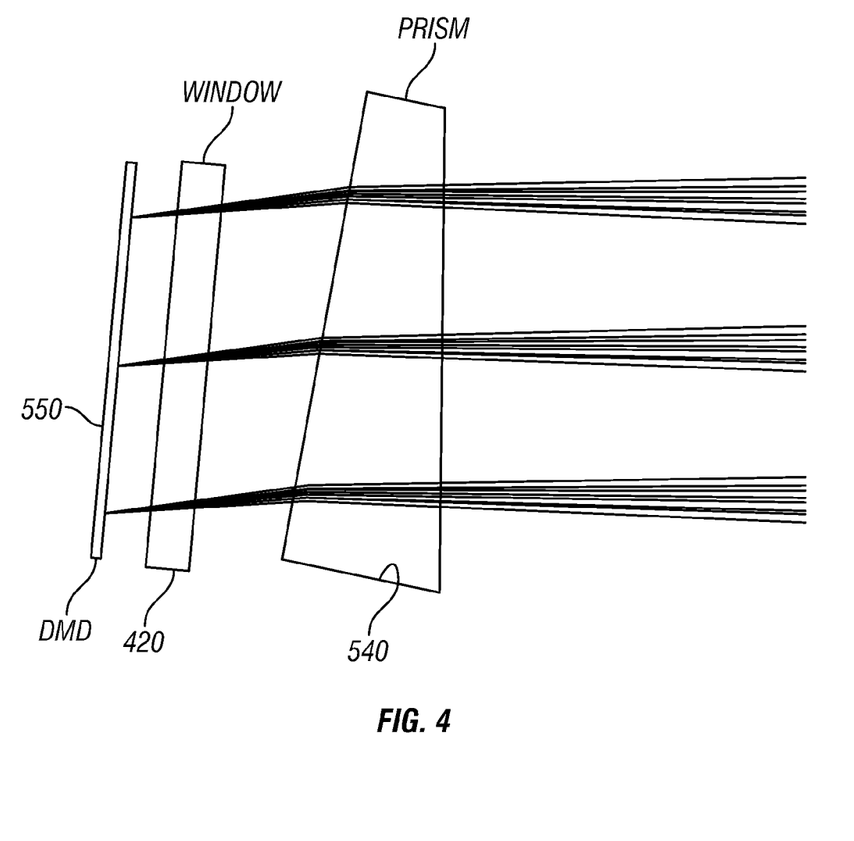
FIG. 4 shows the relationship between the compensating prism and the DMD in an optical processing device.

Because the DMD 550 is tilted, the distance from the scan lens 530 to the DMD 550 varies from fiber to fiber. The function of the compensating prism 540 is to correct for this path length difference so that the beams from all the fibers are focused on the DMD 550. The operation of the compensating prism 540 can be more easily seen in FIG. 4, which shows the relationship between the compensating prism 540 and the DMD 550, which may include a transparent window 420.

The device shown in FIG. 3 has an inherent wavelength dependent loss which limits its performance. To understand the source of this wavelength dependent loss, consider that the DMD 550 is composed of an array of micro mirrors and thus behaves as a diffraction grating rather than a mirror. Strictly speaking, the beams are diffracted off of the DMD, not reflected. The angle of diffraction from the DMD 550 in the plane of the fiber array 505 is given by the grating equation, which shows that the angle of diffraction of the beams from the DMD is wavelength dependent. As a result, coupling between an input and output fiber can only be optimized for a single wavelength, and thus an optical beam experiences a wavelength dependent loss when it is directed through the device.

Figure 5:
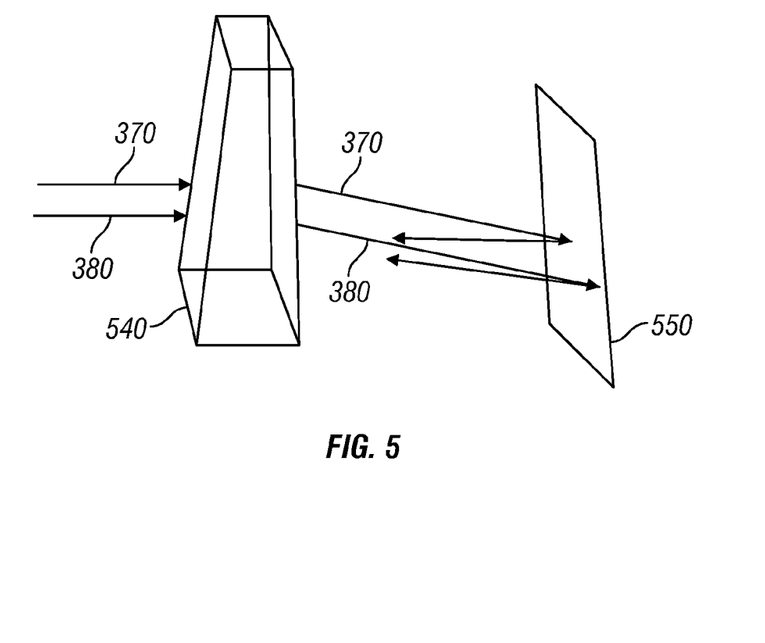
FIG. 5 shows the diffraction of two beams as they pass through a compensating prism and diffract off of s DMD
Figure 6A:
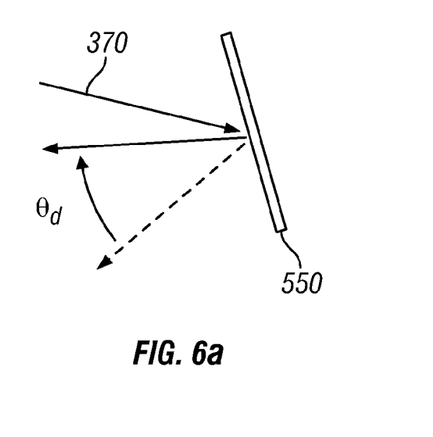
FIG. 6a shows a short wavelength beam being diffracted from a DMD and FIG. 6b shows a long wavelength beam being diffracted from a DMD.
Figure 6B:
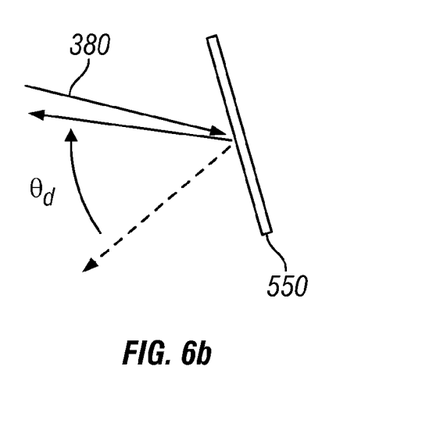

FIG. 5 shows two beams, a short wavelength beam 370 and a long wavelength beam 380, as they pass through the compensating prism 540 and diffract off of the DMD 550. The long wavelength beam 380 diffracts through a larger angle compared to the short wavelength beam 370. This relationship between wavelength and diffraction angle is made clear with reference to FIGS. 6a and 6b. FIG. 6a shows the short wavelength beam 370 (solid line) being diffracted from DMD 550. FIG. 6a also shows the diffraction angle $\theta_d$ though which the beam 370 is diffracted. FIG. 6b similarly shows the long wavelength beam 380 (solid line) being diffracted from DMD 550. FIG. 6b also shows the diffraction angle $\theta_d$ though which the beam 380 is diffracted. Comparison of FIGS. 6a and 6b shows that the longer wavelength beam 380 diffracts through the larger angle.

The wavelength dependent loss can be minimized or eliminated by providing a suitable optical element to compensate for the wavelength dependence of the diffracted angle which is introduced by diffraction from the DMD. In general this optical element should be located downstream from the diffraction grating 522 in FIG. 3, typically in the vicinity of the DMD 550. That is, the optical element may be located between the diffraction grating 522 and the DMD 550. In one implementation, instead of adding an additional optical element to compensate for the wavelength dependency of the diffracted angle, an existing optical element may be modified to perform this function. For example, the shape of the compensating prism 540 in FIG. 3 may be modified to correct for this loss. In this case the compensating prism 540 both adjusts the path length difference experienced by the beams from each fiber and compensates for wavelength dependent loss arising from DMD diffraction.

Figure 7:
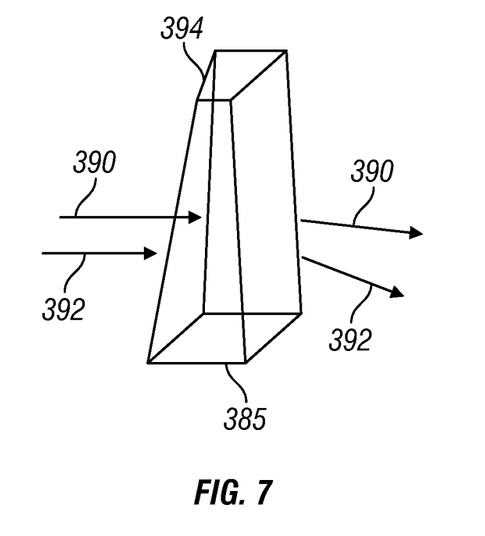
FIG. 7 shows one example of a compensating prism.
Figure 8:
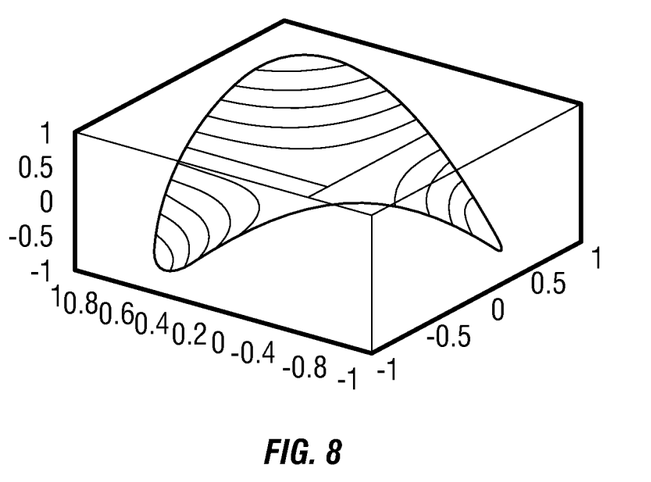
FIG. 8 shows one example of a shape that may be provided to the surface of the compensating prism of FIG. 7.

In one particular implementation, a slight twist may be added to one or both of the surfaces of the compensating prism 540. One example of such a prism is shown in FIG. 7 for the incoming surface 394 of compensating prism 385. As shown, the surface 394 causes the long wavelength beam 392 to be refracted at a greater angle of refraction than the short wavelength beam 390. In this example the surface 394 has the form z=m×y (5$^{th}$ term in the Zernike polynomials), which can be thought of as the sum of two crossed cylinders. The shape of such a surface is shown in FIG. 8. As a consequence, the correction for the wavelength dependent loss can also be achieved by adding cylindrical surfaces to each surface of the compensating prism 385. One advantage of this approach is that a cylindrical surface can be generated using conventional optical polishing methods.

Referring again to FIG. 4, in some implementations the DMD 550, window 420 and compensating prism 540 (or other suitable compensating optical element) may be packaged in a single unit to provide a DMD arrangement that diffracts an optical beam in a wavelength-independent manner. Such a DMD arrangement which may be used in a wide variety of different optical processing devices.

Figure 9A:
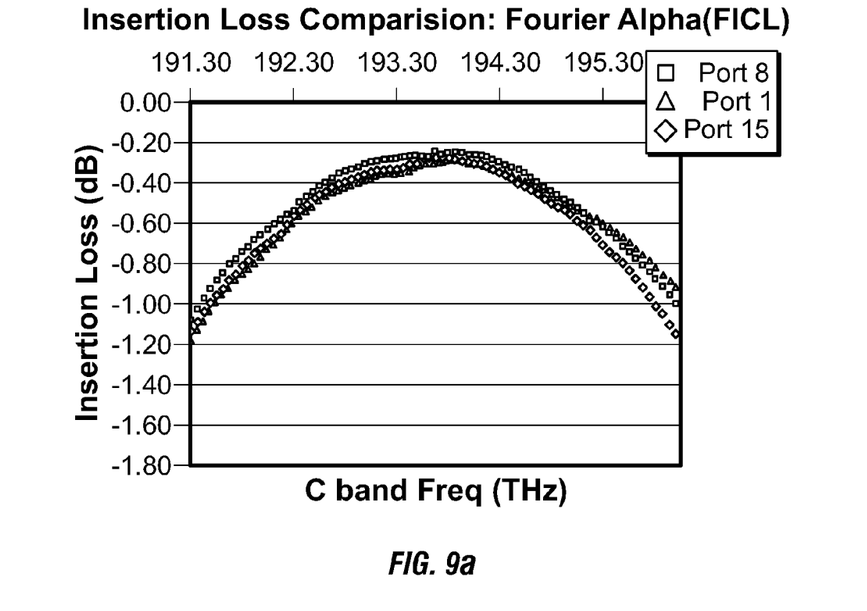
FIGS. 9a and 9b show the insertion loss over a portion of the C-band for an illustrative optical processing device without compensation for the wavelength dependence on the angle of diffraction from the DMD and with compensation for the wavelength dependence on the angle of diffraction, respectively.
Figure 9B:
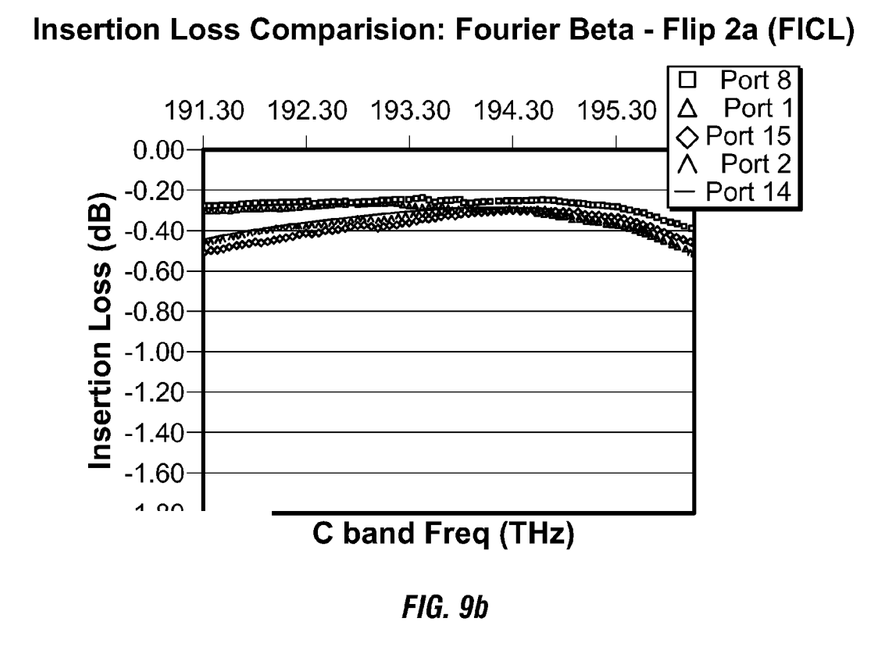

FIGS. 9a and 9b show the insertion loss over a portion of the C-band for an illustrative optical processing device without compensation for the wavelength dependence on the angle of diffraction from the DMD and with compensation for the wavelength dependence on the angle of diffraction, respectively. As shown, the amount of loss and the variation in loss is reduced when the wavelength dependence is reduced.

The invention claimed is:

1. An optical arrangement comprising:
   an actuatable optical element for receiving an optical beam having a plurality of spatially separated wavelength components and diffracting the plurality of wavelength components in an inherently wavelength dependent manner; and
   a compensating optical element directing the optical beam to the actuatable optical element, said compensating optical element compensating for the inherent wavelength dependent manner in which the wavelength components are diffracted by the actuatable optical element.

2. The optical arrangement of claim 1 further comprising at least two optical input/output ports for receiving the optical beam, wherein the actuatable optical element selectively directs at least one of the diffracted wavelength components to one of the optical input/output ports, said compensating optical element reducing optical coupling loss in the diffracted wavelength component caused by the wavelength dependent manner in which the wavelength components are diffracted by the actuatable optical element.

3. The optical arrangement of claim 1 further comprising a collimating optical element for collimating the plurality of wavelength components, said actuatable optical element including a digital micromirror device (DMD) having an array of individual actuatable mirror elements for selectively reflecting the wavelength components, said array of mirrors being oriented such that without provision of the compensating optical element an optical path length between the collimating optical element and the DMD differs from wavelength component to wavelength component, said compensating optical element adjusting the optical path lengths so that they are equal in length for each wavelength component.

4. The optical arrangement of claim 1 wherein said compensating optical element includes at least one surface configured to compensate for the wavelength dependent manner in which the wavelength components are diffracted by the actuatable optical element.

5. The optical arrangement of claim 4 wherein the surface is cylindrical in shape.

6. The optical arrangement of claim 4 wherein the surface has a shape that conforms to a $5^{th}$ term in a Zernike polynomial.

7. The optical arrangement of claim 4 further comprising a collimating optical element for collimating the plurality of wavelength components, wherein the compensating optical element includes at least one refractive and/or reflective surface and is further configured to adjust an optical path length experienced by the wavelength components between the collimating optical element and the actuatable optical element so that the wavelength components are focused onto the actuatable optical element.

8. The optical arrangement of claim 7 wherein the compensating optical element includes a prism.

9. The optical arrangement of claim 2 wherein the at least two input/output ports comprises an optical launch arrangement configured to receive at least one input optical beam and output a spatially overlapping, angularly multiplexed optical beam that is focused at a virtual focal point.

10. The optical arrangement of claim 9 wherein the optical launch arrangement includes a fiber assembly for securing an array of optical fibers and an asymmetric lenslet array having a first surface with a pair of collimating lens in registration with each optical fiber in the array and a second surface with a coupling lens in registration with each pair of collimating lenses.

11. An optical processing device comprising:
    at least two optical input/output ports for receiving an optical beam;
    a dispersion element receiving the optical beam from one of the ports and spatially separating the optical beam into a plurality of wavelength components;
    a collimating lens for collimating the plurality of wavelength components; and
    an actuatable optical element for receiving the collimated wavelength components from the collimating element and diffracting the plurality of wavelength components in an inherently wavelength dependent manner; and
    a compensating optical element located in an optical path between the dispersion element and the actuatable optical element, said compensating optical element compensating for the inherent wavelength dependent manner in which the wavelength components are diffracted by the actuatable optical element.

12. The optical processing device of claim 11 wherein the actuatable optical element selectively directs at least one of the diffracted wavelength components to one of the optical input/output ports, said compensating optical element reducing optical coupling loss in the diffracted wavelength component caused by the wavelength dependent manner in which the wavelength components are diffracted by the actuatable optical element.

13. The optical processing device of claim 11 wherein said actuatable optical element includes a digital micromirror device (DMD) having an array of individual actuatable mirror elements for selectively reflecting the wavelength components, said array of mirrors being oriented such that without provision of the compensating optical element an optical path length between the collimating lens and the DMD differs from wavelength component to wavelength component, said compensating optical element adjusting the optical path lengths so that they are equal in length for each wavelength component.

14. The optical processing device of claim 11 wherein said compensating optical element includes at least one surface configured to compensate for the wavelength dependent manner in which the wavelength components are diffracted by the actuatable optical element.

15. The optical processing device of claim 14 wherein the surface is cylindrical in shape.

16. The optical processing device of claim 14 wherein the surface has a shape that conforms to a $5^{th}$ term in a Zernike polynomial.

17. The optical processing device of claim 14 wherein the compensating optical element includes at least one refractive and/or reflective surface and is further configured to adjust an optical path length experienced by the wavelength components between the collimating lens and the actuatable optical element so that the wavelength components are focused onto the actuatable optical element.

18. The optical processing device of claim 17 wherein the compensating optical element includes a prism.

19. The optical processing device of claim 11 wherein the at least two input/output ports comprises an optical launch arrangement configured to receive at least one input optical beam and output a spatially overlapping, angularly multiplexed optical beam that is focused at a virtual focal point.

20. The optical processing device of claim 19 wherein the optical launch arrangement includes a fiber assembly for securing an array of optical fibers and an asymmetric lenslet array having a first surface with a pair of collimating lens in registration with each optical fiber in the array and a second surface with a coupling lens in registration with each pair of collimating lenses.

21. A method of processing an optical signal, comprising:
diffracting a plurality of spatially separated wavelength components in an inherently wavelength dependent manner with an actuatable optical element; and
compensating for the inherent wavelength dependent manner in which the wavelength components are diffracted by the actuatable optical element.

22. The method of claim 21 further comprising:
collimating the plurality of wavelength components; and
adjusting an optical path length experienced by the collimated wavelength components before being diffracted so that the collimated wavelength components all traverse a common optical path length.

23. The method of claim 22 wherein compensation for the wavelength dependent manner in which the wavelength components are diffracted by the actuatable optical element and adjustment of the optical path length are performed by a common optical element.

* * * * *